V. P. HARRIS.
Vapor-Burner.
No. 211,997. Patented Feb. 4, 1879.
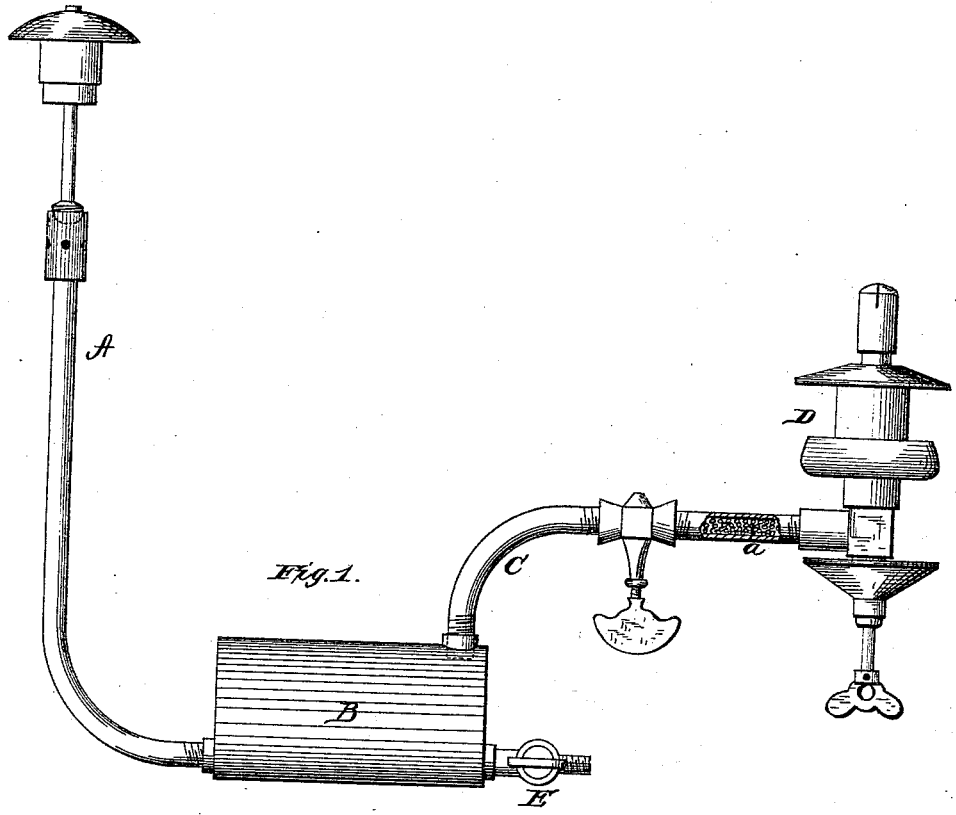

UNITED STATES PATENT OFFICE.

VENENDO P. HARRIS, OF GREENSBURG, INDIANA.

IMPROVEMENT IN VAPOR-BURNERS.

Specification forming part of Letters Patent No. 211,997, dated February 4, 1879; application filed May 15, 1878.

*To all whom it may concern:*

Be it known that I, VENENDO P. HARRIS, of Greensburg, in the county of Decatur and in the State of Indiana, have invented certain new and useful Improvements in Vapor-Burners; and do hereby declare that the following is a full, clear, and exact description thereof, reference being had to the accompanying drawings, and to the letters of reference marked thereon, making a part of this specification.

The nature of my invention consists in a process for distilling and vaporizing hydrocarbon oils for illuminating purposes, and a packing for supply-tube to burners, which will insure an even evaporation of the oil, and in the construction and arrangement of devices, as will be hereinafter more fully set forth, and pointed out in the claim.

In order to enable others skilled in the art to which my invention appertains to make and use the same, I will now proceed to describe its construction and operation, referring to the annexed drawings, in which—

Figure 1 is a side elevation of my invention. Fig. 2 is a section of the supply-tube.

A represents the supply-pipe, through which the gasoline or other hydrocarbon oil is fed from an elevated oil-reservoir to the burners. This supply-pipe extends from the reservoir downward to a point a suitable distance below the burner or burners, where it enters at one end near the bottom of a horizontal cylinder, B. From the top, at the opposite of this cylinder, a pipe, C, then extends to the burner D, this pipe C extending into cylinder B a short distance, which will allow any scum or small particles of organic substance of less specific gravity than the oil used to rise in the cylinder above the lower end of said pipe.

The cylinder B forms a purifier for the hydrocarbon oil, in which the sediment, all tarry substances, or other foreign matter of greater or less specific gravity than the oil will settle or rise and allow nothing but the pure hydrocarbon oil to flow into the burner. To further insure this object the chamber or purifier B may be filled about two-thirds full with water or any liquid that is of greater specific gravity than the oil used in the upper reservoir.

The hydrocarbon oil passing into the purifier at the bottom must pass through this liquid before it can get to the burner, and will become perfectly cleansed and deprived of all impurities, such as sediment or organic matter.

The chamber B is also provided with a stop-cock, E, for cleaning out all deposits as often as required. When water or other liquid is used in this chamber it can be replenished again after cleaning by means of a syringe holding the same quantity as required for the chamber. This syringe is screwed on the end of the stop-cock, which latter is then opened, the liquid injected, and the stop-cock closed again.

The burner D is provided with a packing, $a$, of beads, made of glass or any other material which is non-corrosive, and being punctured with the small holes will always give the same pressure, which cases an even flow of oil.

By the minute and diversified holes through the beads the oil is held from uneven vaporization, no matter how hot it may be, which gives an even and steady pressure.

By my process of supplying the oil I produce a pure and reliable light, the burner not being gummed up by the residuum, and it is always free from sediment, which renders any reasonable-sized flame free from smoke.

A white and strong brilliant light is obtained, and even with a low-gravity grade of hydrocarbon oil that portion which does not readily vaporize falls back into the purifier, and does not impair the light.

Having thus fully described my invention, what I claim as new, and desire to secure by Letters Patent, is—

The combination of the upright oil-supply pipe A, leading into the bottom of the chamber B, filled partially with water, the exit-pipe C, connected to the top of the chamber, and extending slightly into the same, and provided with a stop-cock and a packing of perforated beads, and the burner D, all constructed substantially as and for the purposes herein set forth.

In testimony that I claim the foregoing I have hereunto set my hand and seal this 26th day of April, 1878.

VENENDO P. HARRIS. [L. S.]

Witnesses:
    CHAS. G. PARKE,
    FRANK GLOVER.